US012606979B2

(12) United States Patent
Fuerstenberg

(10) Patent No.: US 12,606,979 B2
(45) Date of Patent: Apr. 21, 2026

(54) DUMP LINER DEVICE

(71) Applicant: Glenn Fuerstenberg, Sioux Falls, SD (US)

(72) Inventor: Glenn Fuerstenberg, Sioux Falls, SD (US)

( * ) Notice: Subject to any disclaimer, the term of this patent is extended or adjusted under 35 U.S.C. 154(b) by 382 days.

(21) Appl. No.: 18/218,862

(22) Filed: Jul. 6, 2023

(65) Prior Publication Data

US 2025/0012040 A1     Jan. 9, 2025

(51) Int. Cl.
| | |
|---|---|
| *E02F 3/407* | (2006.01) |
| *B60P 1/28* | (2006.01) |
| *B60R 13/01* | (2006.01) |
| *E02F 3/96* | (2006.01) |

(52) U.S. Cl.
CPC .............. *E02F 3/407* (2013.01); *B60P 1/286* (2013.01); *B60R 13/01* (2013.01); *E02F 3/962* (2013.01)

(58) Field of Classification Search
None
See application file for complete search history.

(56) References Cited

U.S. PATENT DOCUMENTS

| | | | | |
|---|---|---|---|---|
| 3,035,724 | A | * 5/1962 | Clark | ........................ E02F 3/34 |
| | | | | 37/444 |
| 3,675,349 | A | 7/1972 | Luck | |
| 4,151,664 | A | 5/1979 | Maura | |
| 4,225,283 | A | 9/1980 | Baker | |
| 4,845,867 | A | 7/1989 | Albrecht | |
| 7,712,234 | B2 | 5/2010 | Striegel | |
| 2007/0101621 | A1 * | 5/2007 | Arp | .......................... E02F 3/425 |
| | | | | 37/444 |
| 2007/0107270 | A1 | 5/2007 | Edmond | |
| 2009/0273196 | A1 * | 11/2009 | Ayabe | .................... B62D 63/04 |
| | | | | 293/115 |
| 2019/0111825 | A1 * | 4/2019 | Renger | .................. B60P 1/165 |

FOREIGN PATENT DOCUMENTS

| | | | | |
|---|---|---|---|---|
| EP | 2189578 B1 * | 7/2013 | .............. | E02F 3/964 |

* cited by examiner

*Primary Examiner* — Christopher J Sebesta
*Assistant Examiner* — Alfred H Tsui

(57) ABSTRACT

A dump liner device includes a receptacle, such as a bucket of a digger, having a high side and a low side when in a dumping position. The receptacle has a concave interior surface for holding material in the receptacle while in a holding position. A connection edge of a flexible panel is coupled to the high side of the receptacle. The panel conforms to the interior surface of the receptacle but is unconnected to the receptacle except along the high side such that the panel is gravitationally urged away from the interior surface of the receptacle in the dumping position to facilitate dumping of the material from the receptacle as the receptacle is moved into the dumping position from the holding position.

20 Claims, 6 Drawing Sheets

DUMP LINER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dump devices and more particularly pertains to a new liner for a dumping device to promote full emptying and prevent debris buildup within a receptacle used to collect and dump material such as dirt, rocks, particulate material, or the like.

(2) Description of Related Art Including Information Disclosed Under 37 CFR 1.97 and 1.98

The prior art relates to dump devices such as a bucket for a backhoe or the tub of side dump trailer. Known prior art lacks a liner attached to the bucket or tub to prevent retention or buildup of debris in the bucket or tub.

BRIEF SUMMARY OF THE INVENTION

An embodiment of the disclosure meets the needs presented above by generally comprising a receptacle having a high side and a low side when in a dumping position. The receptacle having a concave interior surface for holding material in the receptacle while in a holding position. A connection edge of a flexible panel is coupled to the high side of the receptacle. The panel conforms to the interior surface of the receptacle but is unconnected to the receptacle except along the high side such that the panel is gravitationally urged away from the interior surface of the receptacle in the dumping position to facilitate dumping of the material from the receptacle as the receptacle is moved into the dumping position from the holding position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
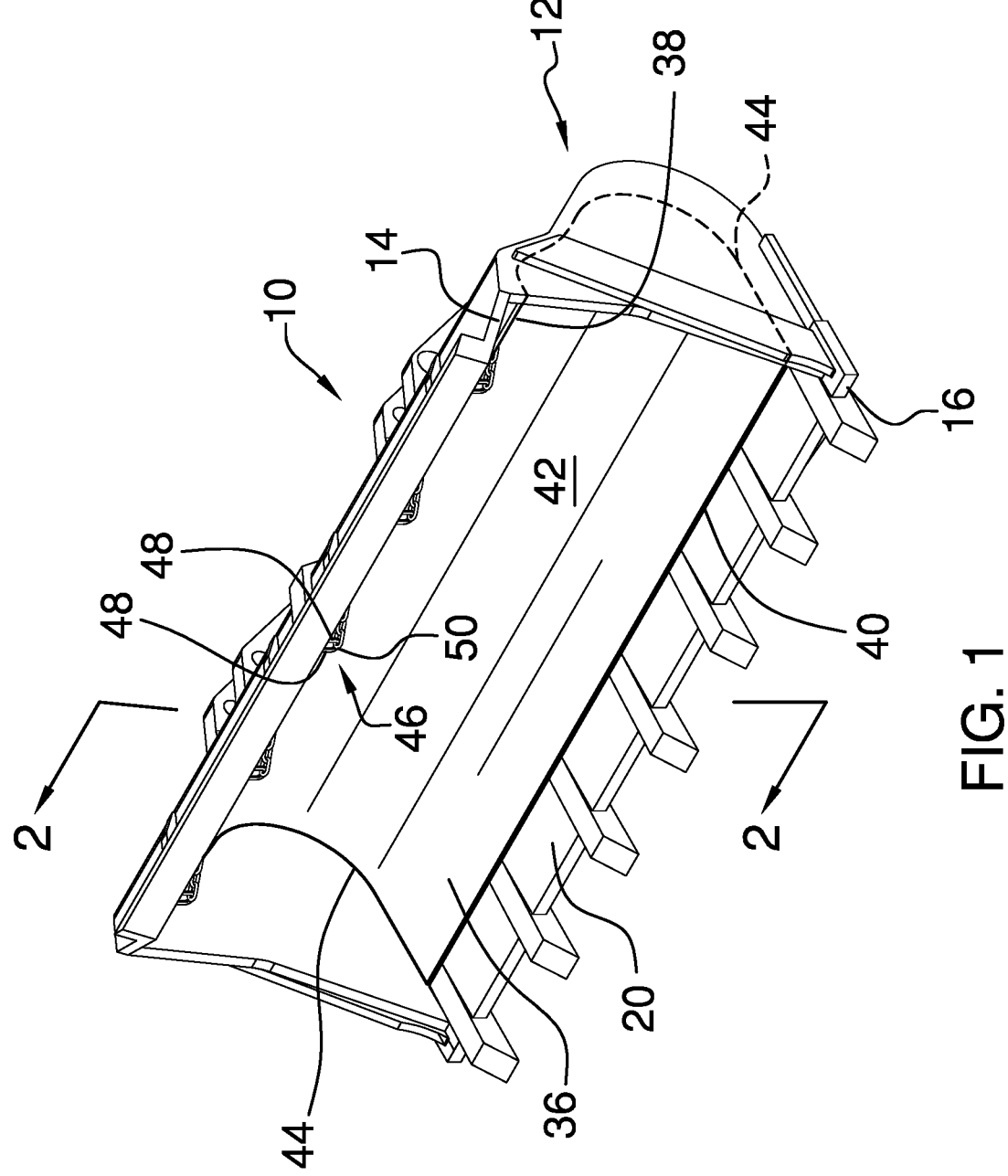
FIG. 1 is a top front side perspective view of a dump liner device according to an embodiment of the disclosure.
Figure 2:
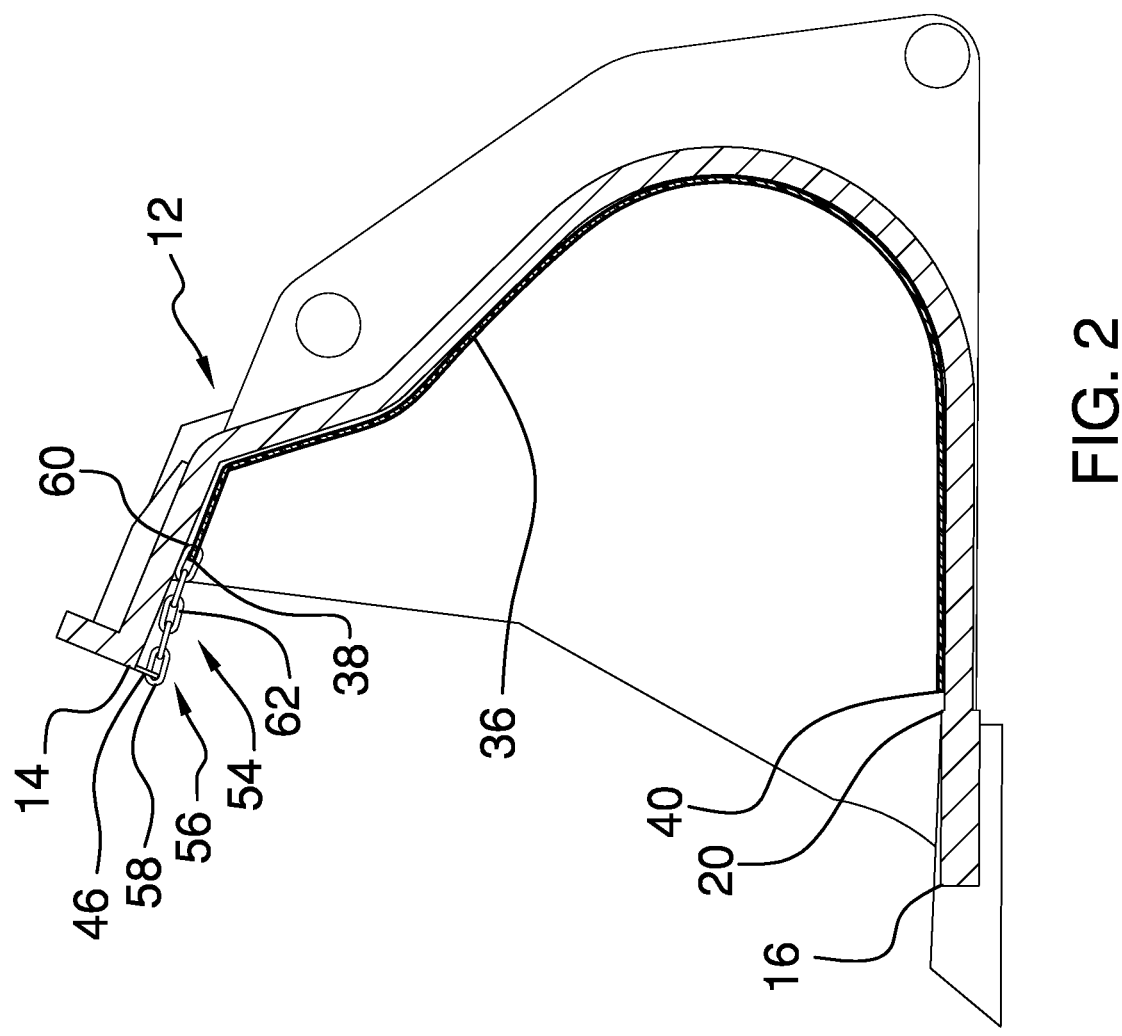
FIG. 2 is a cross-sectional view of an embodiment of the disclosure taken along line 2-2 of FIG. 1.
Figure 3:
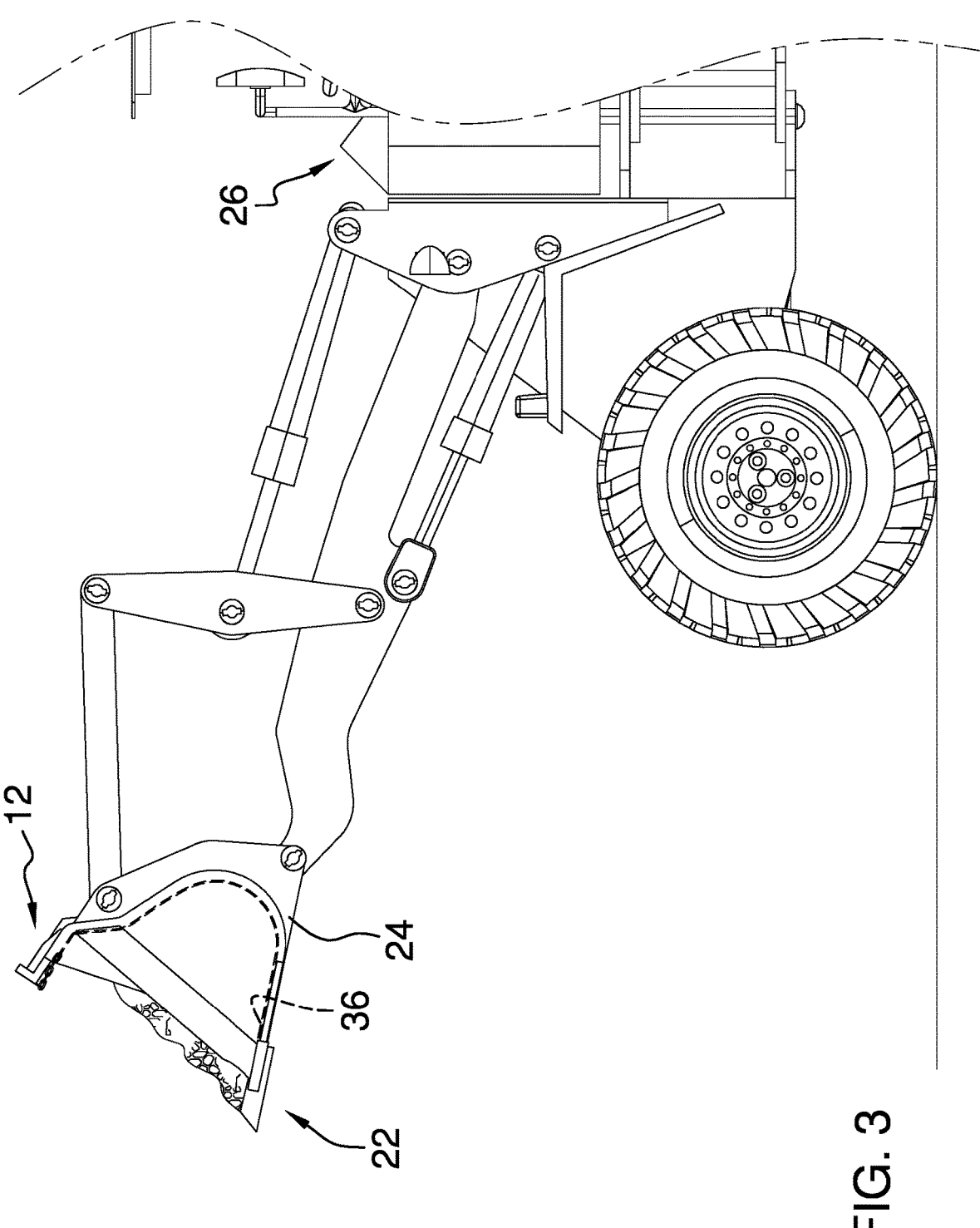
FIG. 3 is a side view of an embodiment of the disclosure in use.
Figure 4:
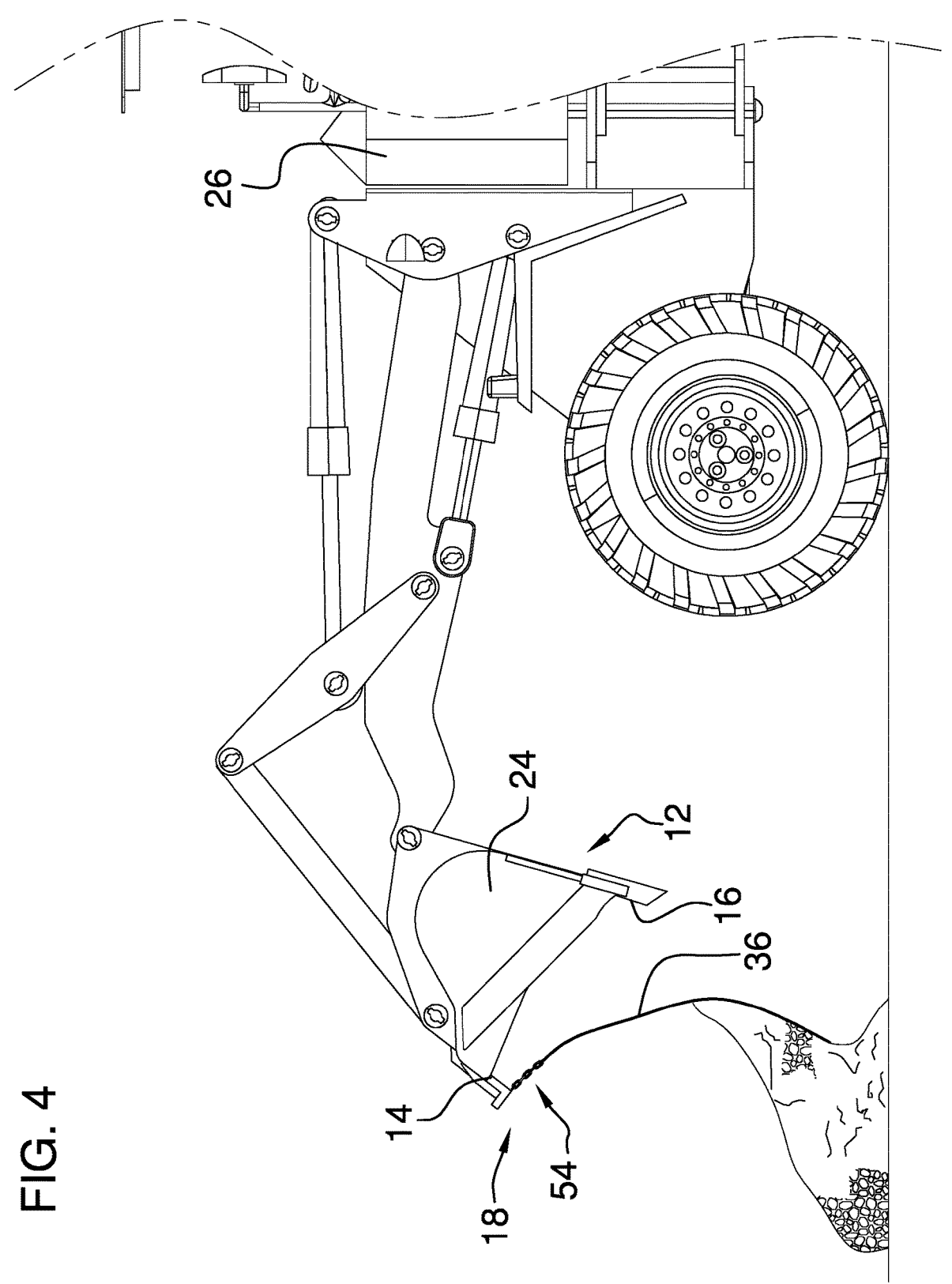
FIG. 4 is a side view of an embodiment of the disclosure in use.
Figure 5:
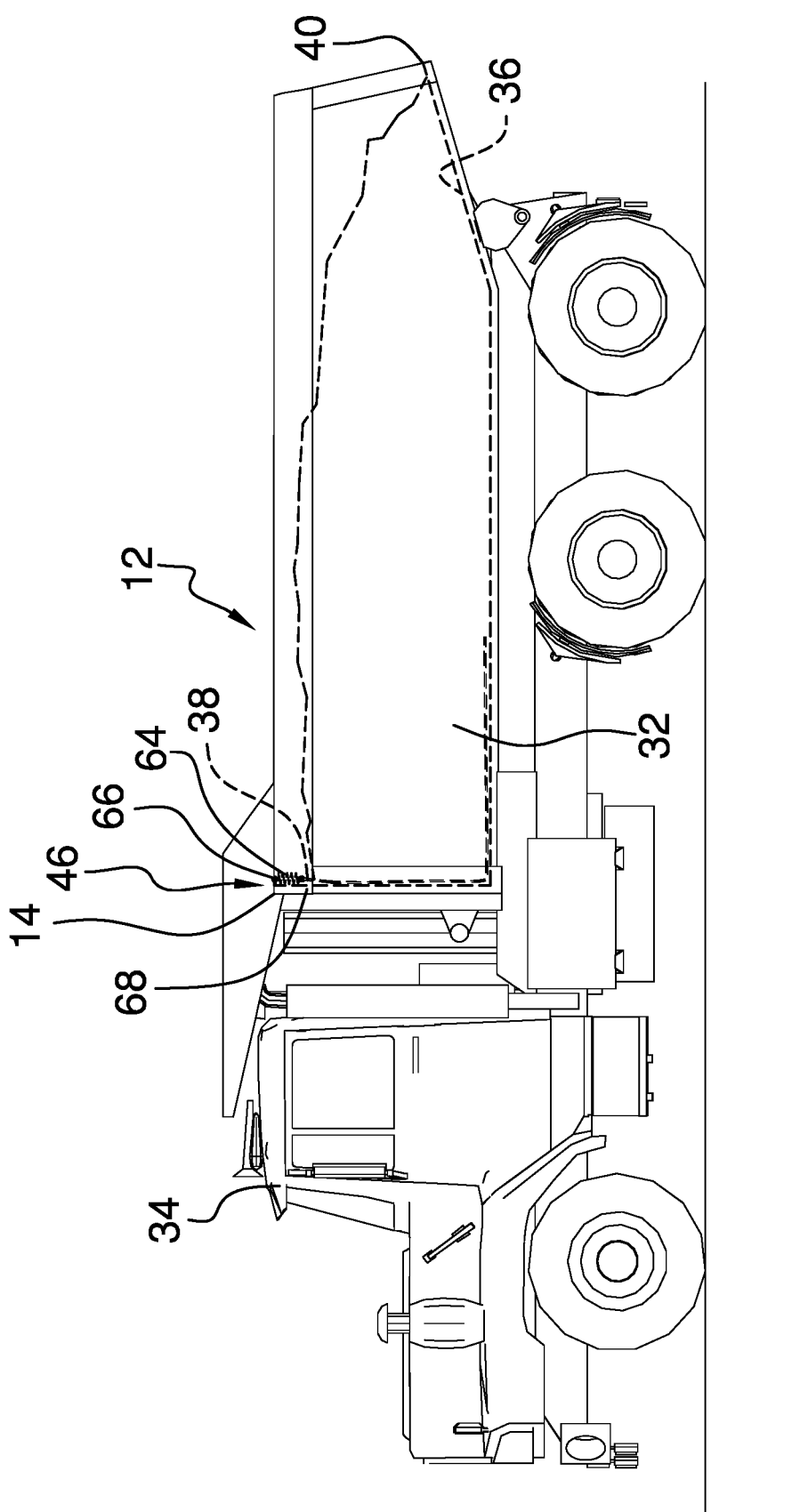
FIG. 5 is a side view of an embodiment of the disclosure in use.
Figure 6:
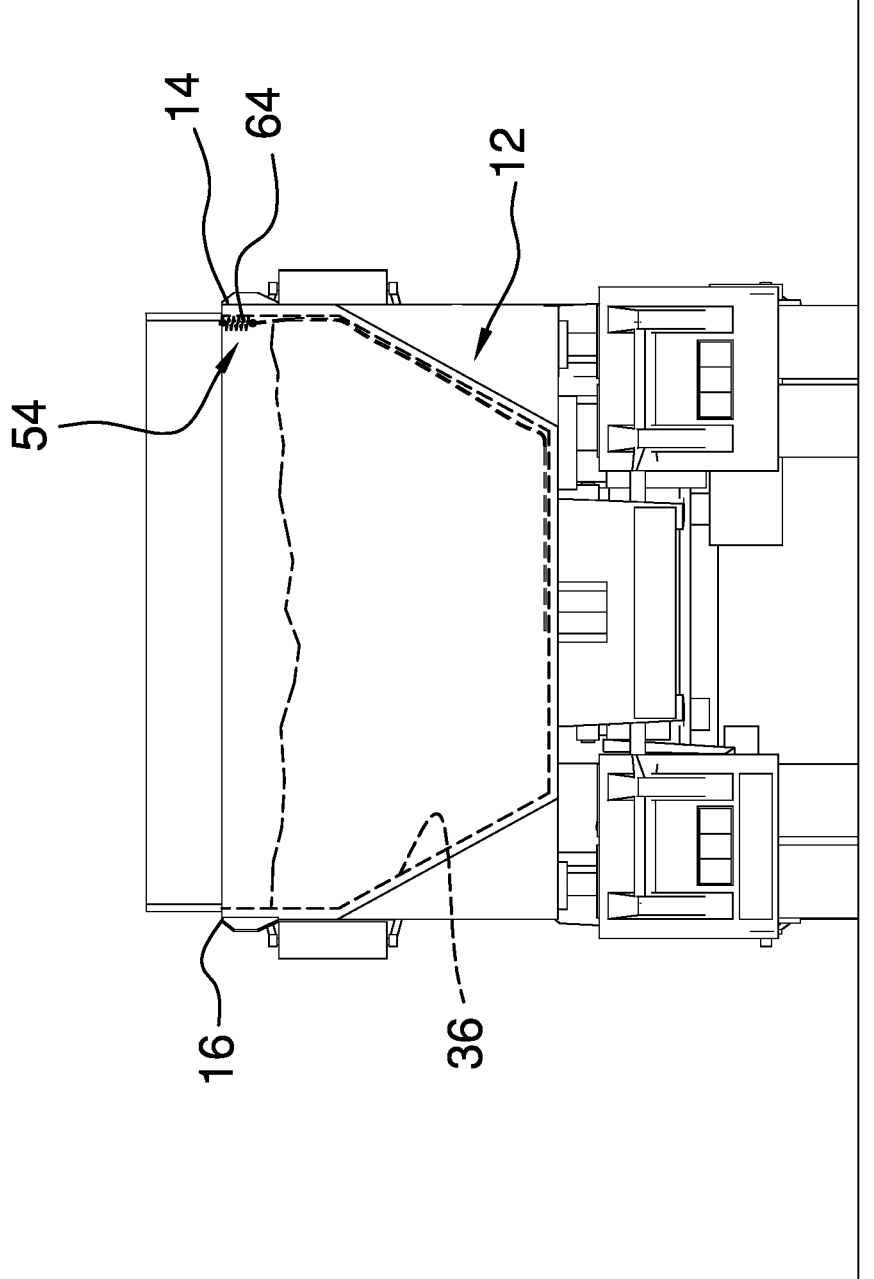
FIG. 6 is a rear view of an embodiment of the disclosure in use.

With reference now to the drawings, and in particular to FIGS. 1 through 6 thereof, a new dump device embodying the principles and concepts of an embodiment of the disclosure and generally designated by the reference numeral 10 will be described.

As best illustrated in FIGS. 1 through 6, the dump liner device 10 generally comprises a receptacle 12 having a high side 14 and a low side 16. The high side 14 is defined by being elevationally higher than the low side 16 when the receptacle 12 is in a dumping position 18. The receptacle 12 has a concave interior surface 20 extending between the high side 14 and the low side 16. The interior surface 20 may be smoothly arcuate or formed by intersecting planar sections such that the receptacle 12 holds material in the receptacle 12 when the receptacle 12 is in a holding position 22. The receptacle 12 is movable between the dumping position 18 and the holding position 22. Generally, the receptacle 12 may be a bucket 24 of a digger 26, or similar vehicle as in FIGS. 3 and 4, a tub 28 of a side dump trailer 30 as in FIG. 6, a bed 32 of a dump truck 34 as in FIG. 5, or other tilted or pivoted container used to collect and subsequently dump contents out of the container.

A panel 36 has a connection edge 38, a free edge 40, and a lining surface 42 extending between the connection edge 38 and the free edge 40. The connection edge 38 of the panel 36 is parallel to the free edge 40 of the panel 36. However, the free edge 40 may be shaped to conform to a non-linear edge of the receptacle 12. The panel 36 is constructed of rubber or a similar material. The connection edge 38 is coupled to the high side 14 of the receptacle 12. The panel 36 is flexible whereby the panel 36 extends into and conforms generally to the interior surface 20 of the receptacle 12 extending from the high side 14 towards the low side 16 when the receptacle 12 is the holding position 22. The panel

3

36 is unconnected to the receptacle 12 except along the high side 14 wherein the panel 36 is gravitationally urged away from the interior surface 20 of the receptacle 12 when the receptacle 12 is moved into the dumping position 18. Thus, the panel 36 is configured to facilitate dumping of the material from the receptacle 12 as the receptacle 12 is moved into the dumping position 18 from the holding position 22. The panel 36 has a width between lateral edges 44 of the panel 36 substantially coextensive with a width of the interior surface 20 of the receptacle 12. It is contemplated that substantially coextensive is understood to mean the panel may have only a slight gap from each lateral edge 44 to the interior surface 20 of the receptacle 12 to facilitate the panel 36 to move freely into the receptacle 12 as the receptacle 12 is moved from the dumping position 18 to the holding position 22.

A bracket 46 is coupled to the receptacle 12. The bracket 46 is positioned along the high side 14 of the receptacle 12. The bracket 46 may be one bracket 46 of a plurality of brackets 46 spaced along the high side 14 of the receptacle 12. Each bracket 46 is U-shaped having a pair of spaced straight sides 48 and an arcuate medial section 50 extending between the spaced straight sides 48. The spaced straight sides 48 of each bracket 46 are parallel and coplanar with the arcuate medial section 50 wherein each bracket 46 is generally planar. Each bracket 46 extends perpendicularly from the interior surface 20 at the high side 14 of the receptacle 12.

A restraint 54 couples the connection edge 38 of the panel 36 to the bracket 46. The restraint 54 may be one restraint 54 of a plurality of restraints 54 such that each restraint 54 is coupled to a respective one of the brackets 46. The restraint 54 may be a chain 56 having a first end 58 coupled to the bracket 46 and a second end 60 coupled to the panel 36. The chain 56 may have a maximum of five links 62. Alternatively, the restraint 54 may be a spring 64 having a first end 66 coupled to the bracket 46 and a second end 68 coupled to the panel 36. It is also contemplated that other intermediate structure may be incorporated into the connection of the panel 36 to the receptacle 12 for greater durability, strength, or any other reason such as facilitating removal and replacement of the panel 36 if desired.

In use, the panel 36 is coupled to the receptacle 12 consistent with the above description. The panel 36 effectively lines the interior surface 20 of the receptacle 12 and is moved by gravity out of the receptacle 12 as the receptacle 12 is moved from the holding position 22 to the dumping position 18. The panel 36 acts to facilitate clearing of the material within the receptacle 12 as the panel 36 is flexible and so avoids having crevices or other structure which would facilitate sticking of the material onto the panel 36, particularly when the panel 36 is hanging freely from the receptacle 12 in the dumping position 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dump liner system comprising:
a receptacle having a high side and a low side, said high side being defined by being elevationally higher than said low side when said receptacle is in a dumping position, said receptacle having a concave interior surface extending between said high side and said low side wherein said receptacle is configured for holding material in said receptacle when said receptacle is in a holding position, said receptacle being movable between said dumping position and said holding position; and
a panel having a connection edge, a free edge, and a lining surface extending between said connection edge and said free edge, said connection edge being coupled to said high side of said receptacle, said free edge being unconnected directly to said receptacle such that said free edge is free to swing away from said receptacle, said panel being flexible whereby said panel extends into and conforms to said interior surface of said receptacle extending from said high side towards said low side when the receptacle is the holding position, said panel being unconnected to said receptacle except along said high side wherein said panel is gravitationally urged away from said interior surface of said receptacle when said receptacle is moved into said dumping position wherein said panel is configured to facilitate dumping of the material from said receptacle as said receptacle is moved into said dumping position from said holding position.

2. The dump liner system of claim 1, further comprising:
a bracket coupled to said receptacle, said bracket extending along said high side of said receptacle; and
a restraint coupling said connection edge of said panel to said bracket.

3. The dump liner system of claim 2, further comprising said restraint being a chain having a first end coupled to said bracket and a second end coupled to said panel.

4. The dump liner system of claim 2, further comprising said restraint being a spring having a first end coupled to said bracket and a second end coupled to said panel.

5. The dump liner system of claim 2, further comprising:
said bracket being one bracket of a plurality of brackets spaced along said high side of said receptacle; and
said restraint being one restraint of a plurality of restraints, each restraint being coupled to a respective one of said brackets.

6. The dump liner system of claim 1, further comprising said panel having a width between lateral edges of said panel coextensive with a width of said interior surface of the receptacle.

7. The dump liner system of claim 1, further comprising said receptacle being a bucket of a digger.

8. The dump liner system of claim 1, further comprising said receptacle being a tub of a side dump trailer.

9. The dump liner system of claim 1, further comprising said receptacle being a bed of a dump truck.

10. The dump liner system of claim 1, further comprising said panel being constructed of rubber.

11. The dump liner system of claim 1, further comprising said connection edge of said panel being parallel to said free edge of said panel.

12. The dump liner system of claim 3, further comprising said chain having a maximum of five links.

13. The dump liner system of claim 2, further comprising said bracket being U-shaped having a pair of spaced straight sides and an arcuate medial section extending between said spaced straight sides, said spaced straight sides being parallel wherein said bracket is planar.

14. The dump liner system of claim 13, further comprising said bracket extending perpendicularly from said interior surface at said high side of said receptacle.

15. A dump liner system comprising:

a receptacle having a high side and a low side, said high side being defined by being elevationally higher than said low side when said receptacle is in a dumping position, said receptacle having a concave interior surface extending between said high side and said low side wherein said receptacle is configured for holding material in said receptacle when said receptacle is in a holding position, said receptacle being movable between said dumping position and said holding position; and a panel having a connection edge, a free edge, and a lining surface extending between said connection edge and said free edge, said connection edge of said panel being parallel to said free edge of said panel, said panel being constructed of rubber, said connection edge being coupled to said high side of said receptacle, said free edge being unconnected directly to said receptacle such that said free edge is free to swing away from said receptacle, said panel being flexible whereby said panel extends into and conforms to said interior surface of said receptacle extending from said high side towards said low side when the receptacle is the holding position, said panel being unconnected to said receptacle except along said high side wherein said panel is gravitationally urged away from said interior surface of said receptacle when said receptacle is moved into said dumping position wherein said panel is configured to facilitate dumping of the material from said receptacle as said receptacle is moved into said dumping position from said holding position, said panel having a width between lateral edges of said panel coextensive with a width of said interior surface of the receptacle;

a bracket coupled to said receptacle, said bracket being positioned along said high side of said receptacle, said bracket being one bracket of a plurality of brackets spaced along said high side of said receptacle, each bracket being U-shaped having a pair of spaced straight sides and an arcuate medial section extending between said spaced straight sides, said spaced straight sides of each bracket being parallel wherein each bracket is planar, each bracket extending perpendicularly from said interior surface at said high side of said receptacle; and a restraint coupling said connection edge of said panel to said bracket, said restraint being one restraint of a plurality of restraints, each restraint being coupled to a respective one of said brackets.

16. The dump liner system of claim 15, further comprising said restraint being a chain having a first end coupled to said bracket and a second end coupled to said panel, said chain having a maximum of five links.

17. The dump liner system of claim 15, further comprising said restraint being a spring having a first end coupled to said bracket and a second end coupled to said panel.

18. The dump liner system of claim 15, further comprising said receptacle being a bucket of a digger.

19. The dump liner system of claim 15, further comprising said receptacle being a tub of a side dump trailer.

20. The dump liner system of claim 15, further comprising said receptacle being a bed of a dump truck.

* * * * *